United States Patent [19]

Thayer

[11] Patent Number: 5,501,503
[45] Date of Patent: Mar. 26, 1996

[54] VEHICULAR DOOR

[76] Inventor: Henry Thayer, 1 Mass Ave., Worcester, Mass. 01609

[21] Appl. No.: 216,947

[22] Filed: Mar. 24, 1994

[51] Int. Cl.⁶ ................................................. B60J 5/12
[52] U.S. Cl. ..................... 296/146.8; 296/50; 160/201
[58] Field of Search ........................... 296/146.8, 146.9, 296/146.11, 146.13, 106, 24.1, 50, 51; 160/201; 49/197

[56]  References Cited

U.S. PATENT DOCUMENTS

| 1,375,212 | 4/1921  | Crone          | 296/50      |
| 1,725,750 | 8/1929  | Brinten        | 296/106 X   |
| 2,786,712 | 3/1957  | Whiting        | 296/106     |
| 2,855,989 | 10/1958 | Pritchard      | 296/106 X   |
| 3,104,910 | 9/1963  | Kappen         | 296/61 X    |
| 3,302,690 | 2/1967  | Hurd           | 160/201     |
| 3,424,222 | 1/1969  | Stoner et al.  | 160/201 X   |
| 3,572,815 | 3/1971  | Hackney        | 296/40      |
| 3,693,693 | 9/1972  | Court          | 296/51 X    |
| 3,967,671 | 7/1976  | Stanley et al. | 160/201 X   |
| 4,379,585 | 4/1983  | Strick         | 296/146.8   |
| 4,511,173 | 4/1985  | Wentzel        | 296/146.8 X |
| 4,860,813 | 8/1989  | Ballyns et al. | 296/50 X    |
| 4,893,666 | 1/1990  | Hörmann        | 160/201 X   |

FOREIGN PATENT DOCUMENTS 673412  6/1952  United Kingdom ............... 296/50

Primary Examiner—Joseph Pape
Attorney, Agent, or Firm—George E. Kersey

[57]  ABSTRACT

An exterior roll door for providing access to the interior of a trailer mounted on the outside, with door tracks on the outside in channels in the sides of a header, forming top rails, the door tracks having open sides facing outwardly and mounted inwardly from the rear edge of the trailer along the header, with the tracks along the header, before reaching the top corner of the trailer, curving towards the outer edges of the trailer, and then back to form top rails substantially flush with the roof of the trailer to allow the door to seal the trailer when in a down closed-position, while allowing the door to clear the corner of the trailer during opening, and then allowing the opened door to sit above the roof when in the up, fully-open position.

17 Claims, 9 Drawing Sheets

FIG. 1A
PRIOR ART
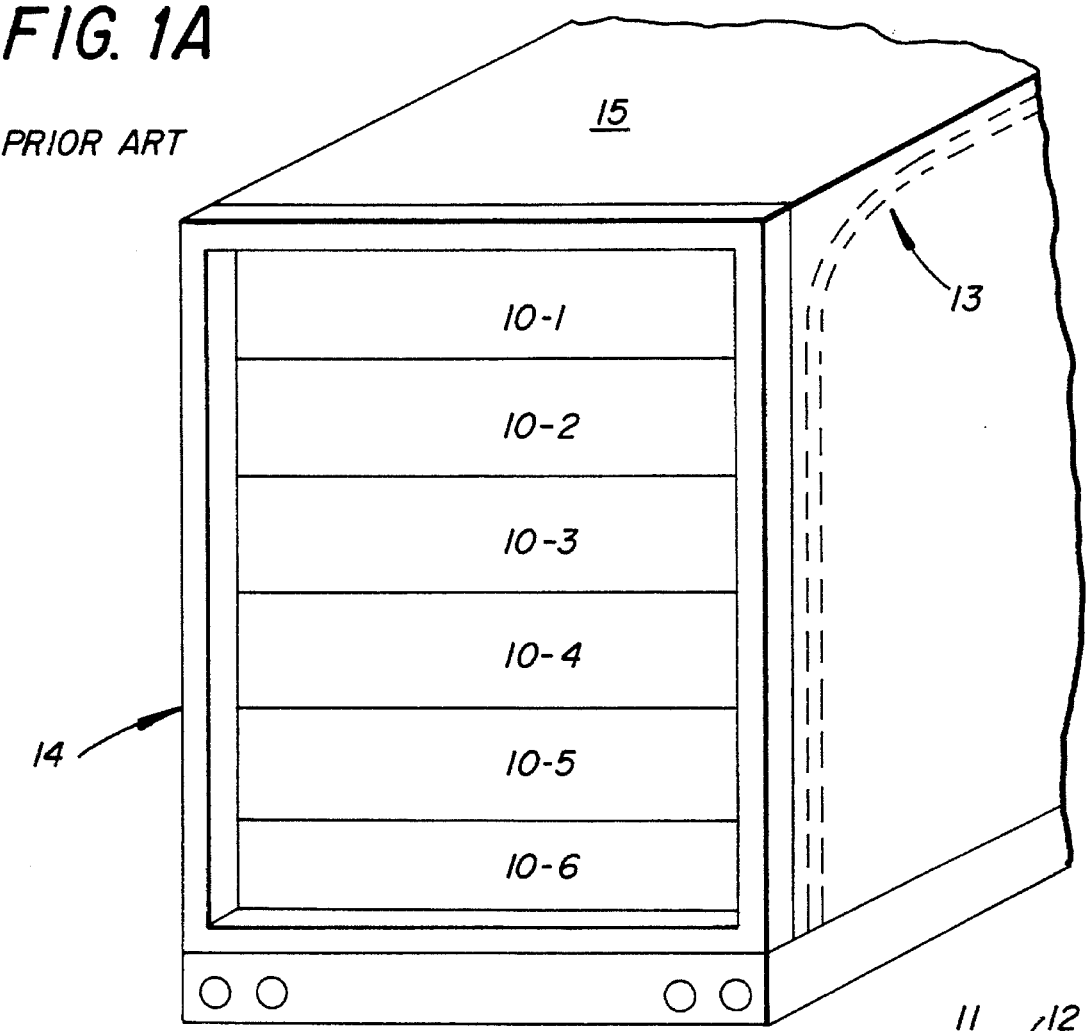
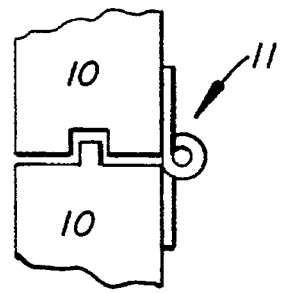
FIG. 1A(a)
PRIOR ART
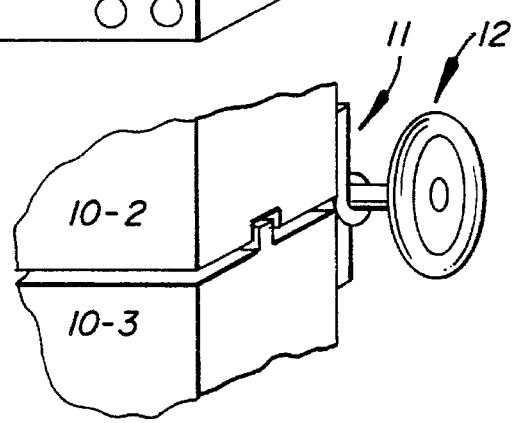
FIG. 1A(b)
PRIOR ART

FIG. 1B
PRIOR ART
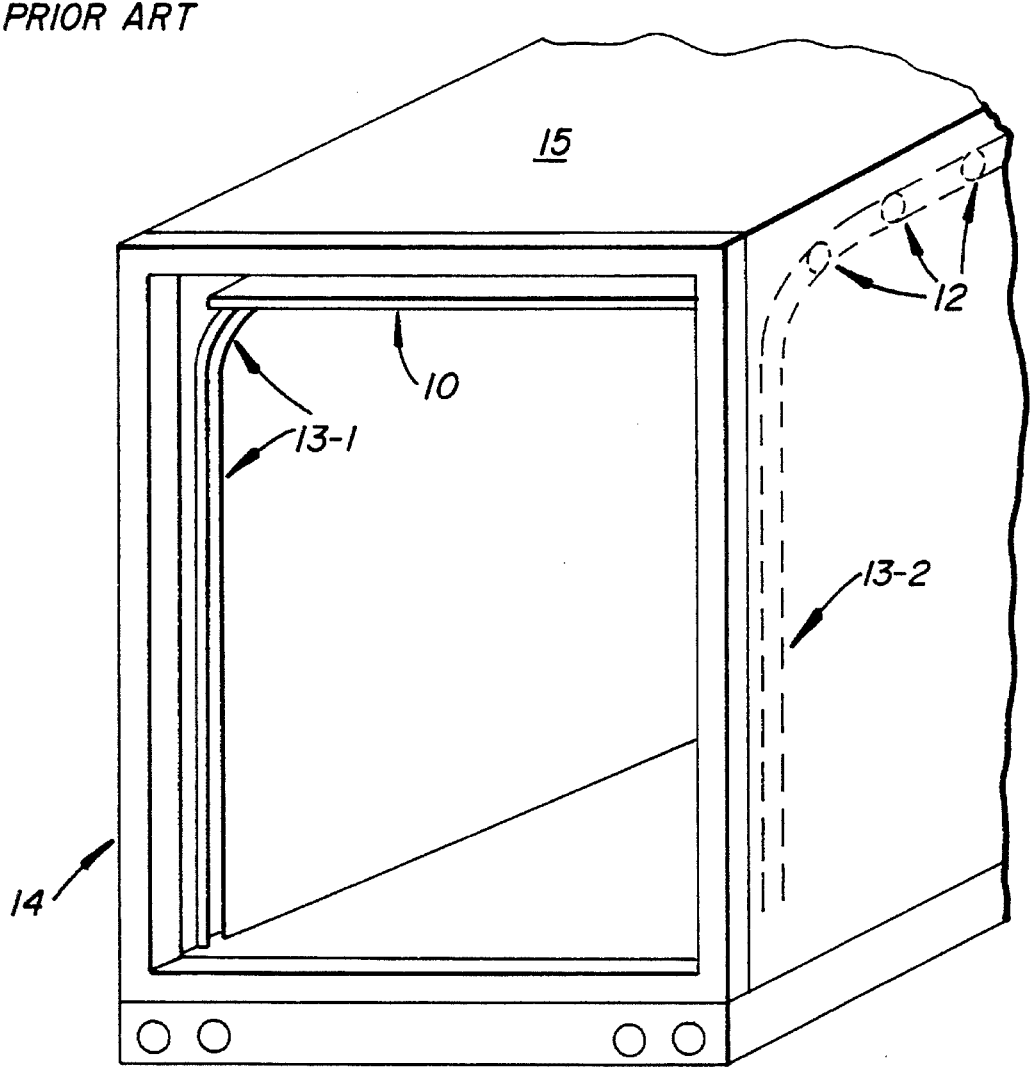
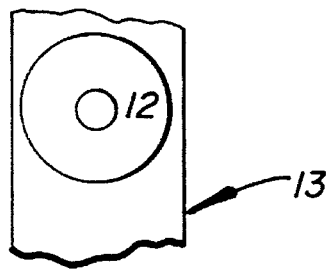
FIG. 1B(a)
PRIOR ART
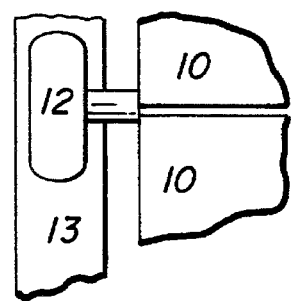
FIG. 1B(b)
PRIOR ART

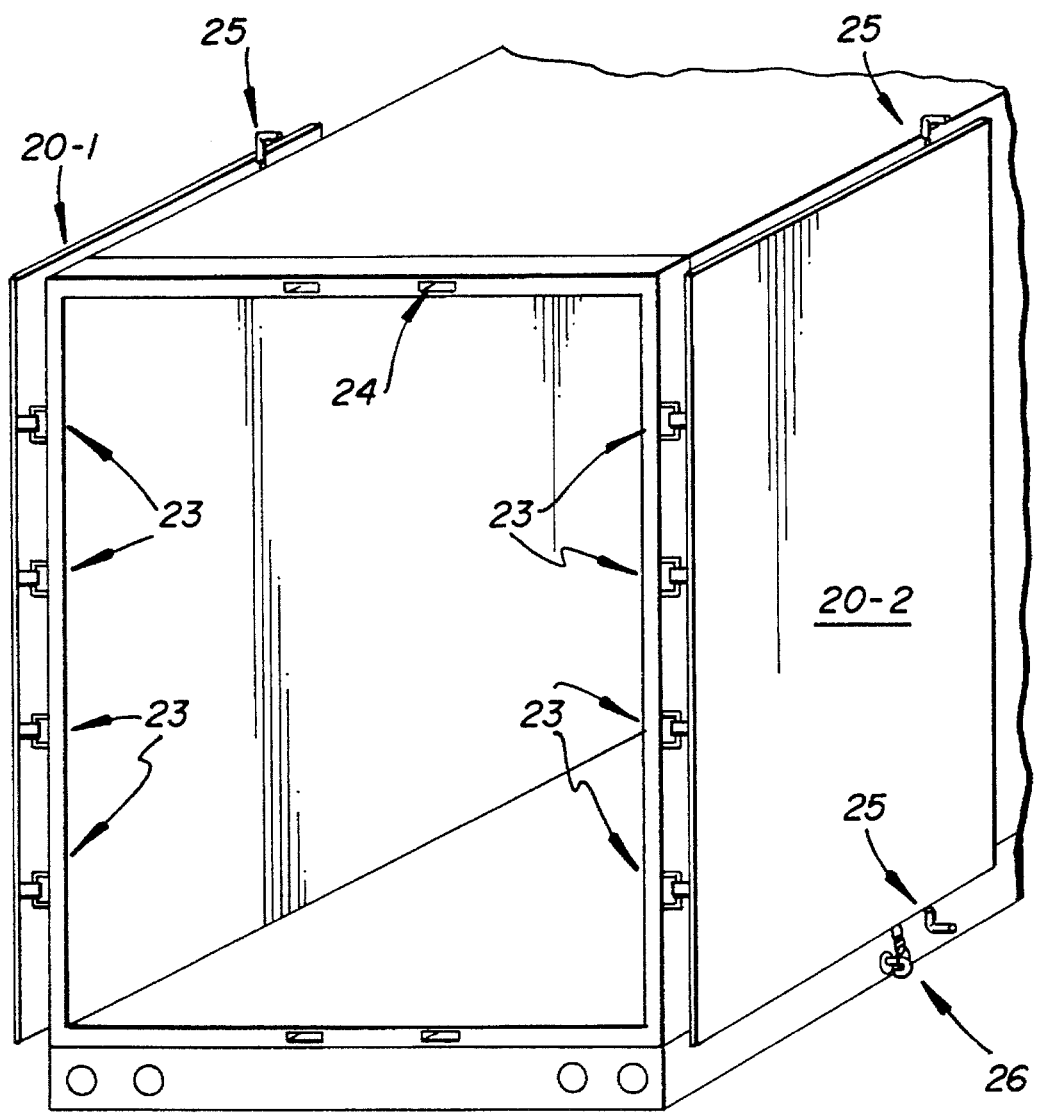

FIG. 4A
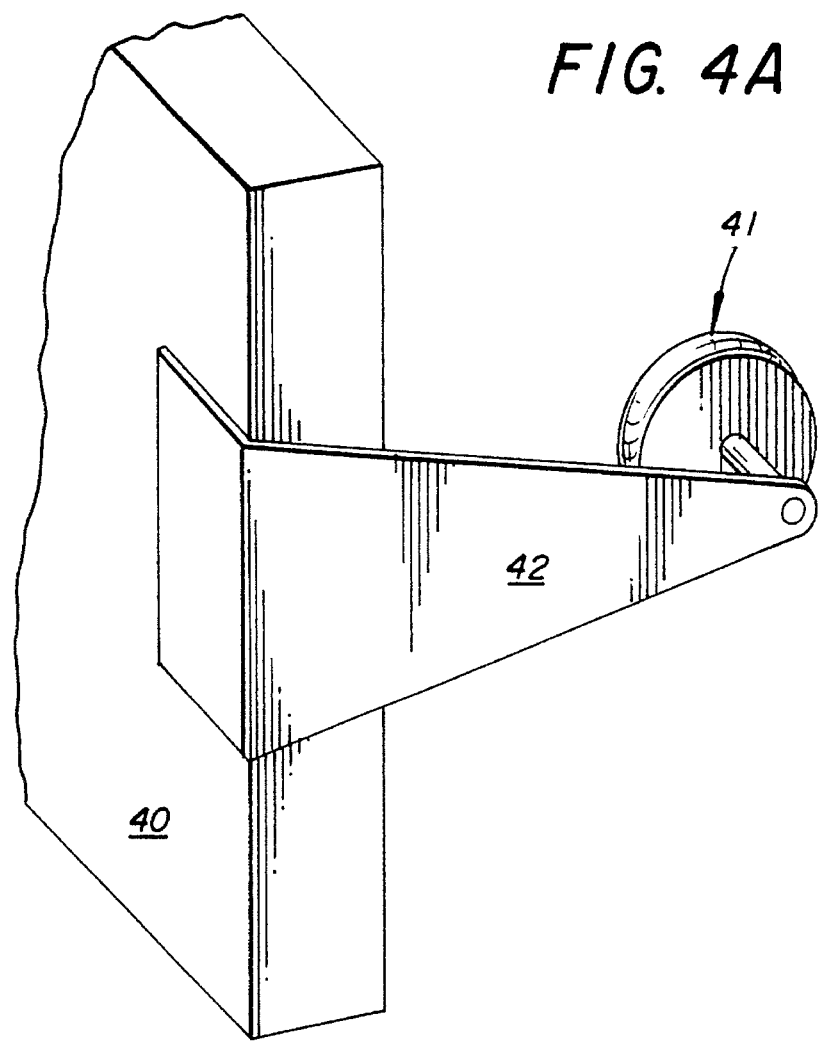
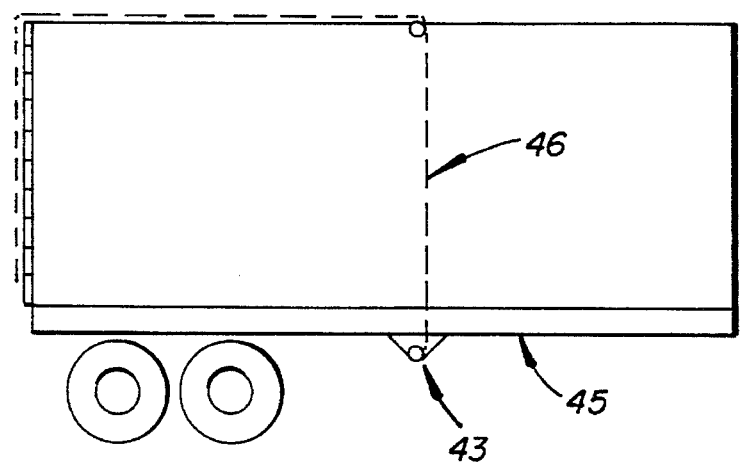
FIG. 4C

VEHICULAR DOOR

BACKGROUND OF THE INVENTION

This invention relates to access openings for vehicles and more particularly to advantageous doors for semi-trailers.

Vehicles, such as semi-trailers, are generally of two types. They are either of the "roll-up" type or the "swing" type door.

The roll-up door found in trailers is similar in type to the vehicular access door commonly associated with garages. The roll-up trailer door typically is constructed from a series of wooden panels, each about one inch in thickness and twelve to eighteen inches in height. Ordinarily the panels run the width of the door opening and are held together by hinges. At opposed lateral edges of the door are a series of wheel-like rollers, known as "door rollers", which ride in vertical tracks, "door tracks", that run along the inside of the door frame, which is known as a "header". Beyond the header the door tracks extend up under the roof of the trailer. A spring mechanism helps raise the door. When the door is closed, it is held fast against the inside of the header by the track and roller system. When open, the door is stored under the roof of the trailer, supported by the door rollers and door tracks.

There is an advantage from the roll-up door because it is inside the trailer at all times. As a result, the door can be opened and closed when the trailer is at a loading dock, in an ally, or next to another trailer. However, there is the disadvantage that the roll-up door is entirely contained within the trailer. Consequently, the elevated roll-up door takes up space that could otherwise be used for cargo. For a company operating on a narrow profit margin, extra cargo space per trailer can make a difference between making money and losing money.

The second type of trailer access is provided by the swing door, which is formed by two doors mounted on hinges at the sides of the header. The doors are of a sheet-metal and plywood sandwich, and have weather stripping around the edges to prevent leakage. When closed, the swing doors are held in place by a pair of lock bars that run from the bottom of the header to the top. When the doors are opened, they swing outwardly, around the outer corners of the trailer. The swing doors can be held in an open position by small chains or other restraining devices.

Swing doors have the advantage that because they are externally mounted, the doors do not take up any room inside the trailer. This allows cargo to be stacked all the way to the roof and throughout the length of the trailer. However, swing doors have the disadvantage that they require a significant amount of room to be opened and closed. As a result, the swing doors must be opened before backing up to a loading dock. Thereafter, the swing doors cannot be closed again without pulling away from the dock. In addition, the swing doors cannot be locked in open position unless there is sufficient side clearance for the doors to swing all the way around to the sides of the trailer. Finally, when a swing door is in its locked-open position, it can be broken off if another trailer hits it.

Accordingly, it is an object of the invention to provide a single type of door that will satisfy customers for both roll-up and swing-type operation.

A related object is to provide a vehicular door that has all of the advantages of both current trailer door types, and none of their disadvantages.

Another object of the invention is to avoid the disadvantage that the roll-up door is entirely contained within the trailer. A related object is to overcome the disadvantage that the elevated roll-up door takes up space that could otherwise be used for cargo. A still another related object is to assist companies operating on narrow profit margins by providing extra cargo space per trailer, which can make a difference between making money and losing money.

A further object is to avoid the disadvantage of swing doors in that they require a significant amount of room to be opened and closed. A related object is to eliminate the need that swing doors must be opened before backing up to a loading dock with the consequence that the swing doors cannot be closed again without pulling away from the dock. Another related object is to avoid the difficulty that swing doors cannot be locked in open position unless there is sufficient side clearance for the doors to swing all the way around to the sides of the trailer. Still another related object is to overcome the difficulty that when a swing door is in its locked-open position, it can be broken off if another trailer hits it.

A further object is to retain the advantage provided by the roll-up door because it is inside the trailer at all times, so that the door can be opened and closed when the trailer is at a loading dock, in an ally, or next to another trailer.

A still further object is to retain the advantage provided by swing doors because they are externally mounted, so that the doors do not take up any room inside the trailer, allowing cargo to be stacked all the way to the roof and throughout the length of the trailer.

Still other objects of the invention include the avoidance of exterior clearance problems accompanying the use of roll-door designs; avoidance of interior cargo clearance problems; avoiding protrusion of any part of the door or door assembly outside the legal exterior dimensions for semi-trailers; avoiding intrusion of any part of the door or door assembly into the cargo space of the trailer; providing a door without significantly more moving parts than standard roll doors; and providing a door not any harder to repair than a standard roll door, be as durable as current designs, not leak in the rain and be well protected against damage done by forklifts or other trucks.

SUMMARY OF THE INVENTION

In accomplishing the foregoing and related objects the invention provides an exterior roll door which provides for mounting the roll door on the outside of the vehicle.

In accordance with one aspect of the invention the externally mounted roll door is constructed of multiple terminal and intermediate panels. The terminal panels are at the top and bottom of the door, illustratively eight to ten inches in height, and the intermediate panels between the top and bottom panels are narrower than the terminal panels, illustratively about six inches in height.

In accordance with another aspect of the invention, the panels are held together using two-way hinges. The abutting edges of the door panels can be beveled for clearance and notched or weather stripped to prevent leakage.

In accordance with a further aspect of the invention, door tracks are mounted on the outside of the vehicle in channels in the sides of the header and as top rails on the vehicle. The open sides of the door tracks face outwardly. Along the header, the door tracks are advantageously mounted about three inches from the rear edge of the trailer. Just before reaching the top corner of the trailer, the tracks curve towards the edge of the trailer, and then curve back to form top rails almost flush with the roof of the trailer. This arrangement allows the door to seal when in a down (closed) position, while allowing the door to clear the corner of the trailer during opening, and then allowing the opened door to sit a few inches above the roof when in the up (fully open) position.

In accordance with a still further aspect of the invention door rollers are mounted on brackets about three inches long. One end of each bracket holds a roller, and the other end is fastened to the center of the outer edge of the associated door panel. Like the current roll doors, the exterior door of the invention is raised by a spring mechanism. However, rather than being mounted inside the trailer where it would take up cargo space, the spring assembly for the exterior door is mounted either on the nose rail of the trailer or underneath the trailer.

To prevent damage from side impacts, steel guard plates are fastened to the sides of the header. These guard plates can cover the door tracks and rollers.

DESCRIPTION OF THE DRAWINGS

Other aspects of the invention will become apparent after considering several illustrative embodiments, taken in conjunction with the drawings, in which:

FIG. 1A is a perspective view of a vehicle with a conventional roll-up door in closed position;

FIG. 1A(a) is a partial side view of the door of FIG. 1A showing two panels held together by a hinge;

FIG. 1A(b) is a partial perspective view showing two panels with a wheel-like roller, known as a "door roller", which rides in a vertical track ("door track"), that runs along the inside of the door frame, known as a "header";

FIG. 1B is a perspective view of the vehicle of FIG. 1A with the conventional roll-up door in open position;

FIG. 1B(a) is a fragmentary view showing a wheel-like roller in a track for the door of FIG. 1B;

FIG. 1B(b) is a fragmentary front view showing the wheel-like roller in a track and joined to two panels of the door of FIG. 1B;

FIG. 2B is a perspective view of the vehicle of FIG. 2A with the conventional swing door in open position;

FIG 3A(a) is a fragmentary side view of the door of FIG. 3A showing two door panels held together using a two-way hinge;

FIG. 4A is a perspective view in accordance with the invention showing door rollers mounted on brackets;

FIG. 4C is a perspective view showing a spring mechanism for elevating an exterior door of the invention mounted underneath the trailer.

DETAILED DESCRIPTION

Figure 2A:
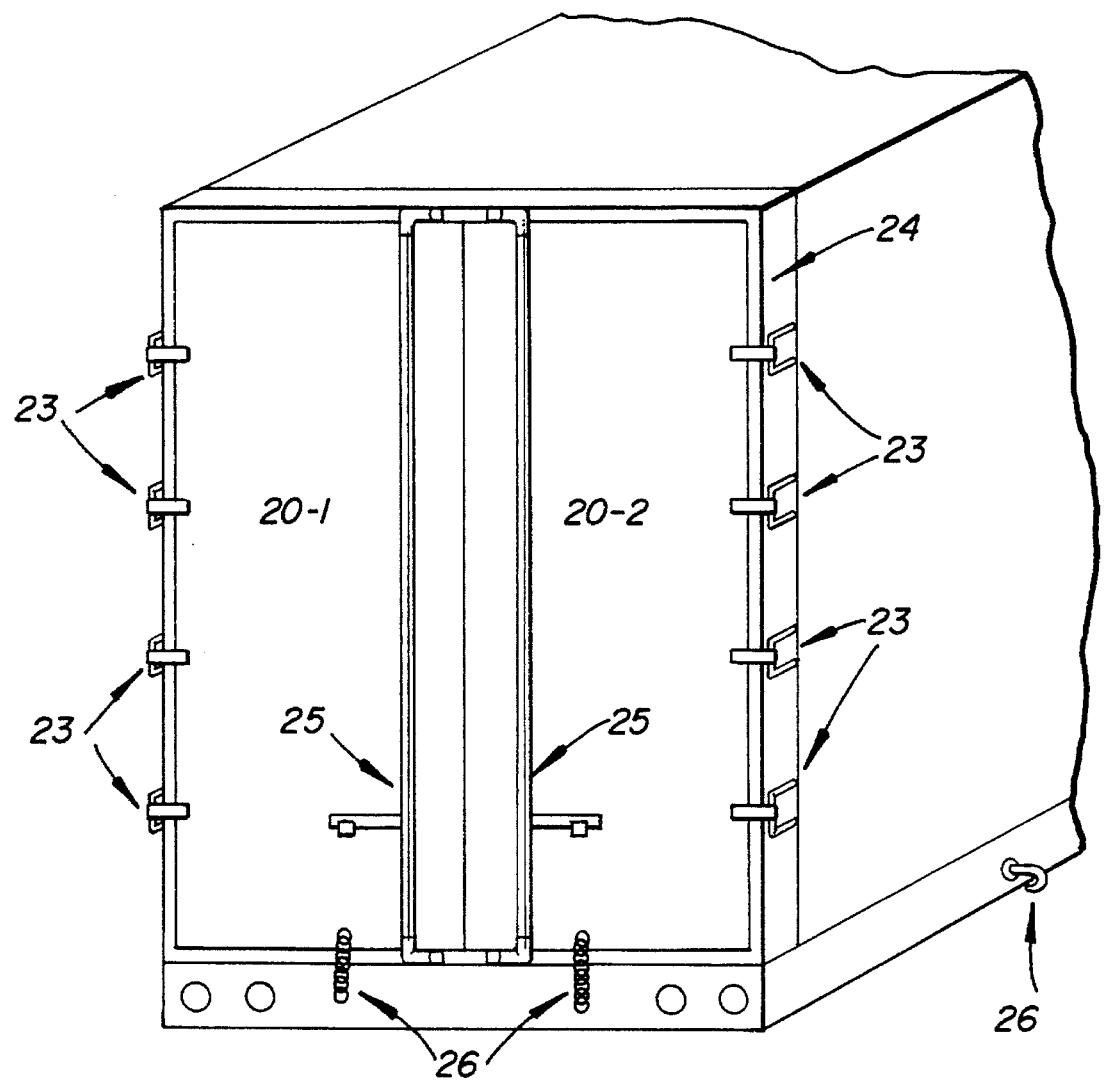
FIG. 2A is a perspective view of a vehicle with a conventional swing door in closed position.

With reference to the drawings, the trailer roll-up rear access door 10 of FIG. 1A is similar to the vehicular access door commonly associated with garages. The roll-up trailer door 10 is constructed from a series of wooden panels 10-1 through 10-6, each about one inch in thickness and twelve to eighteen inches in height. The panels 10-1 through 10-6 run the width of the door opening and are held together by hinges 11. At opposed lateral edges of the door are a series of wheel-like rollers 12, known as "door rollers", which ride in vertical tracks 13-1 and 13-2, "door tracks", that run along the inside of the door frame 14, which is known as a "header". Beyond the header 14 the door tracks 13-1 and 13-2 extend up under the roof 15 of the trailer 10. A spring mechanism helps raise the door 10.

When the door 10 is closed as shown in FIG. 1A, it is held fast against the inside of the header 14 by the track and roller system.

When the door is open as shown in FIG. 1B, it is stored under the roof 15 of the trailer, supported by the door rollers 12 and door tracks 13-1 and 13-2.

There is an advantage from the roll-up door because it is inside the trailer at all times. As a result, the door can be opened and closed when the trailer is at a loading dock, in an ally, or next to another trailer. However, there is the disadvantage that the roll-up door is entirely contained within the trailer. Consequently, the elevated roll-up door takes up space that could otherwise be used for cargo. For a company operating on a narrow profit margin, extra cargo space per trailer can make a difference between making money and losing money.

Turning to FIG. 2A, the second type of conventional trailer access is seen to be provided by the swing door 20, which is formed by two doors 20-1 and 20-2 mounted on hinges 23 at the sides of the header 24. The doors 20-1 and 20-2 are of a sheet-metal and plywood sandwich, and can have weather stripping around the edges to prevent leakage. When closed as shown in FIG. 2A, the swing doors 20-1 and 20-2 are held in place by a pair of lock bars that run from the bottom of the header 24 to the top.

When the doors 20-1 and 20-2 are opened as shown in FIG. 2B, they swing outwardly, around the outer corners of the trailer. The swing doors 20-1 and 20-2 can be held in an open position by small chains 26, or other restraining devices.

The swing doors 20-1 and 20-2 have the advantage that because they are externally mounted, they do not take up any room inside the trailer. This allows cargo to be stacked all the way to the roof and throughout the length of the trailer. However, the swing doors 20-1 and 20-2 have the disadvantage that they require a significant amount of room to be opened and closed. As a result, the swing doors 20-1 and 20-2 must be opened before backing up to a loading dock. Thereafter, the swing doors 20-1 and 20-2 cannot be closed again without pulling away from the dock. In addition, the swing doors 20-1 and 20-2 cannot be locked in open position unless there is sufficient side clearance for the doors to swing all the way around to the sides of the trailer. Finally, when a swing door, such as the door 20-1, is in its locked-open position, it can be broken off if another trailer hits it.

Figure 3A:
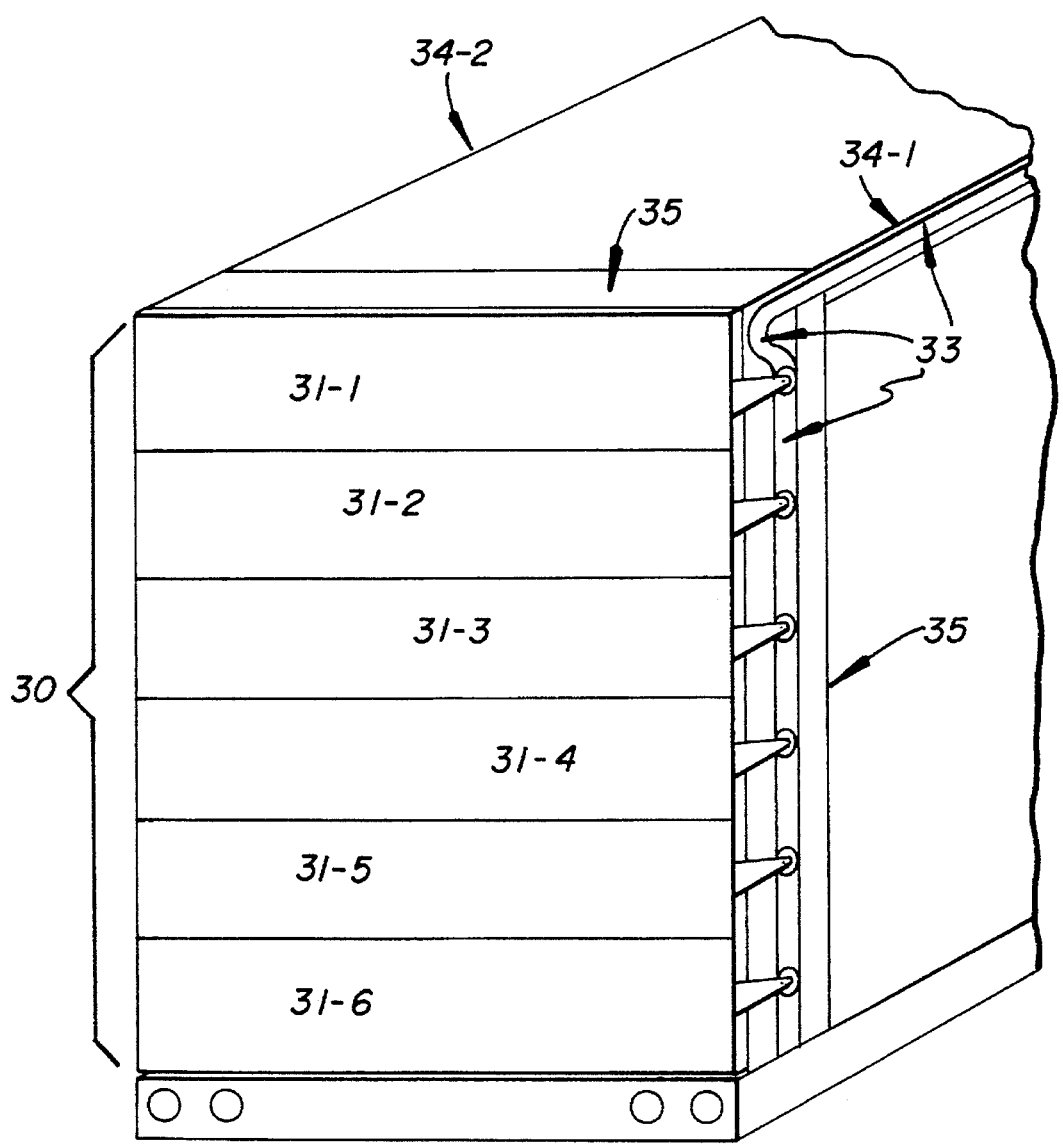
FIG. 3A is a perspective view of a vehicle with a roll-up door of the invention in closed position.
Figure 3A:
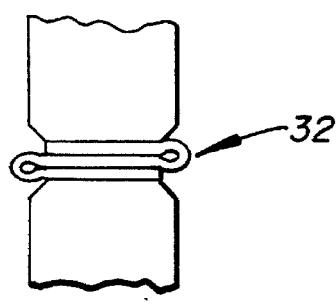

With reference now to FIG. 3A, a roll-up door 30 of the invention is shown in closed position mounted on the outside of the associated vehicle. The externally mounted roll door 30 is constructed of multiple terminal and intermediate panels 31. The terminal panels 31-1 and 31-6 are at the top and bottom of the door 30, and are eight to ten inches in height. The intermediate panels 31-2 through 31-5 between the top and bottom panels 31-1 and 31-6 are narrower than the terminal panels, and are about six inches in height.

The panels 31 are held together using two-way hinges 32. The abutting edges of the door panels 31 are beveled for clearance and notched and weather stripped to prevent leakage. Door tracks 33-1 and 33-2 are mounted on the outside of the vehicle in channels in the sides of the header 35, and in the top rails 34-1 and 34-2 on the vehicle. The open sides of the door tracks 33-1 and 33-2 face outwardly. Along the header 35, the door tracks 33-1 and 33-2 are mounted about three inches from the rear edge of the trailer. Just before reaching the top corner of the trailer, the tracks 33-1 and 33-2 curve towards the edge of the trailer, and then curve back to form top rails 34-1 and 34-2 almost flush with the roof of the trailer. This arrangement allow the trailer to seal when in a down (closed) position as shown in FIG. 3A, while allowing the door to clear the corner of the trailer during opening, and then allowing the opened door to sit a few inches above the roof when in the up (fully open) position as shown in FIG. 3B, which is a perspective view of the vehicle of FIG. 3A with its roll-up door in open position.

In FIG. 4A, which is a perspective view in accordance with the invention showing door rollers 41 mounted on brackets 42, each about three inches long. One end of each bracket 42 holds a roller 41, and the other end is fastened to the center of the outer edge of the associated door panel 40.

Figure 3B:
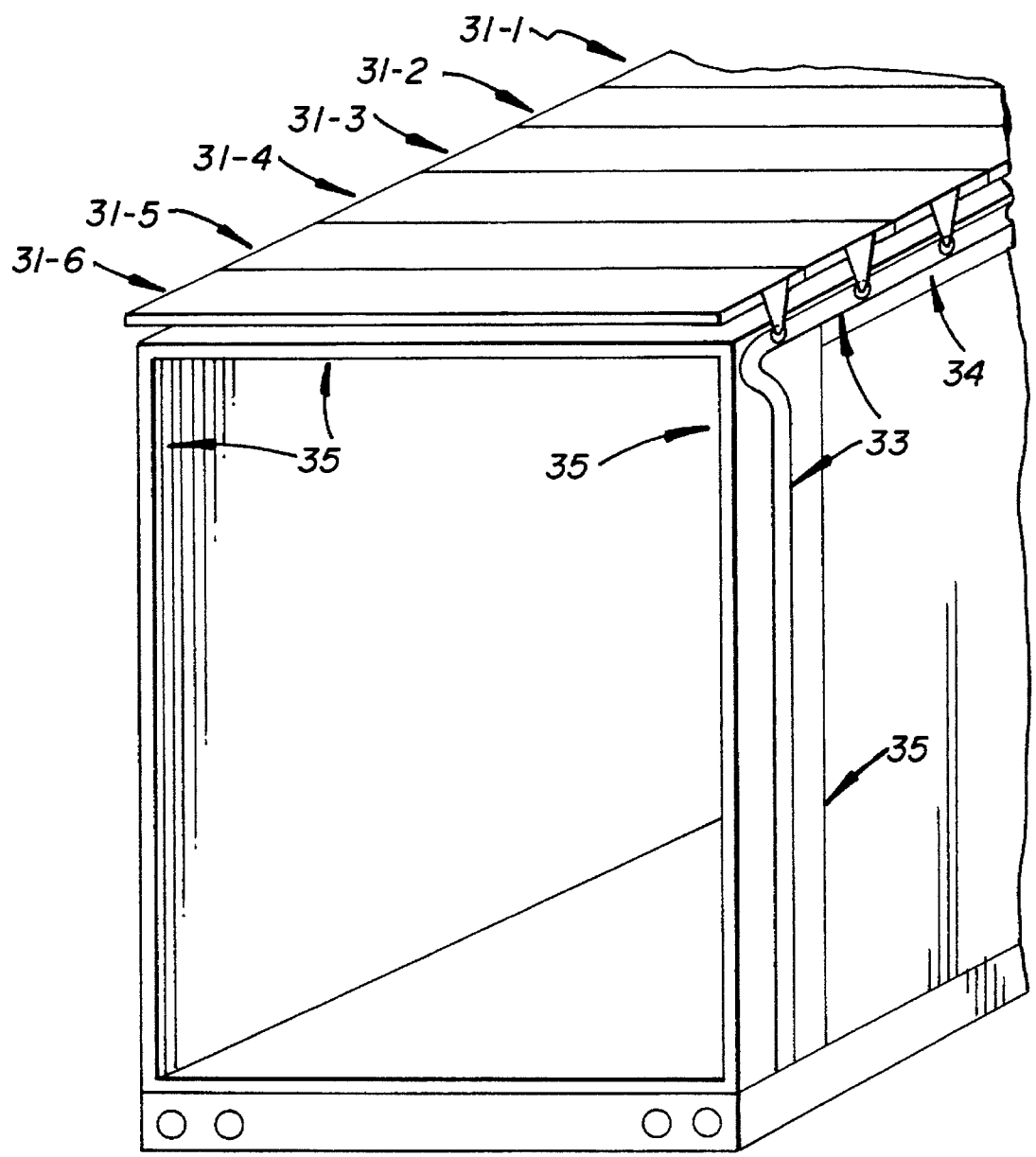
FIG. 3B is a perspective view of the vehicle of FIG. 3A with its roll-up door in open position.
Figure 4B:
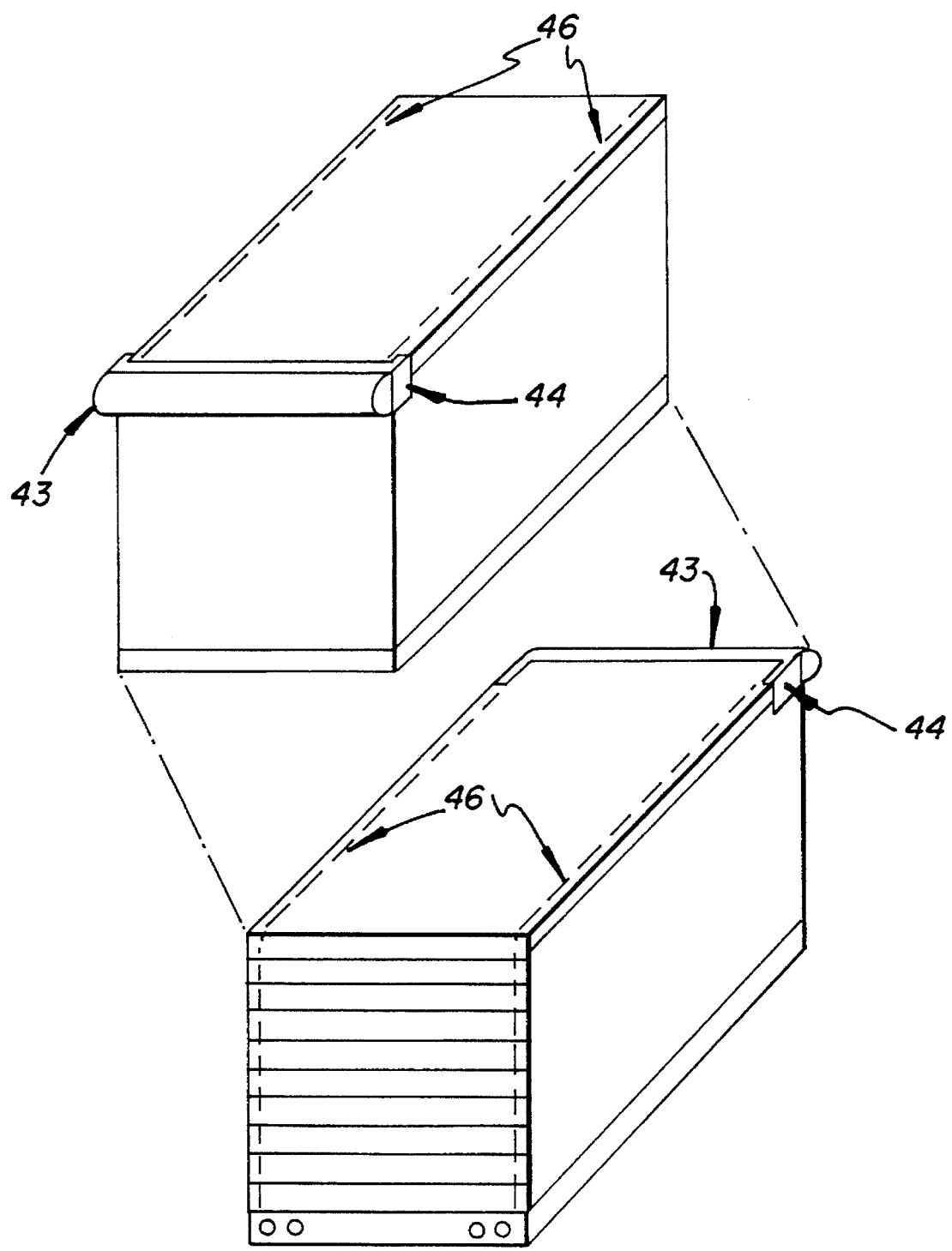
FIG. 4B is a perspective view showing a spring mechanism for elevating an exterior door of the invention mounted on the nose rail of a trailer.

A spring mechanism 43 for elevating the exterior door 30 of FIGS. 3A and 3B is shown in FIG. 4B mounted on the nose rail 44 of a trailer. The spring mechanism 43 is like that for current roll doors. However, rather than being mounted inside the trailer where it would take up cargo space, the spring assembly 43 for the exterior door is mounted on the nose rail 44 of the trailer. Alternatively, in FIG. 4C the spring mechanism 43 for elevating an exterior door 30 of the invention is mounted underneath the trailer at position 45. The door cable 46 are shown as dotted lines in FIG. 4B and FIG. 4C.

Figure 4D:
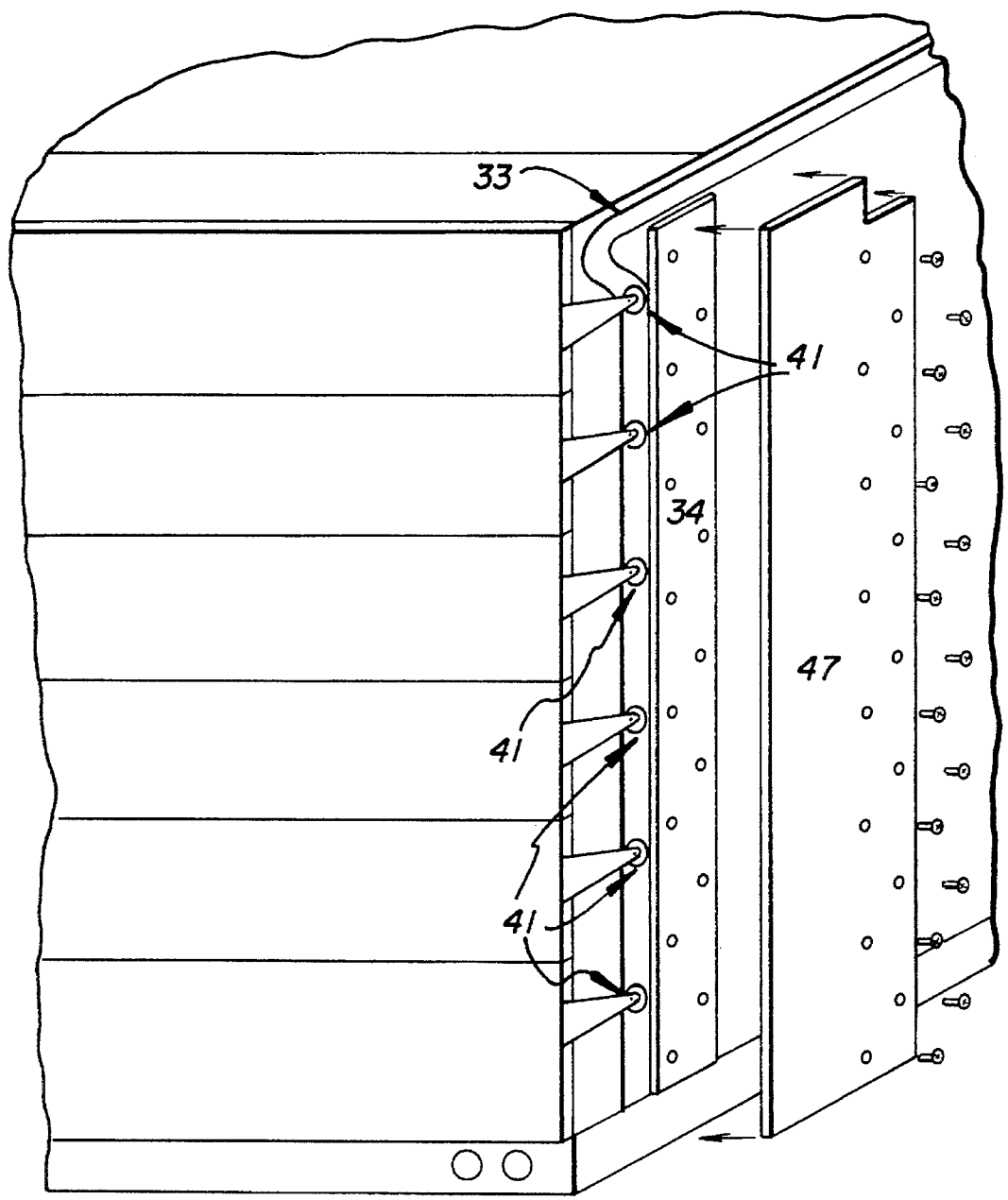
FIG. 4D is a view of steel guard plates fastened to the sides of the trailer header covering the door tracks and rollers to protect them.

To prevent damage from side impacts, as shown in FIG. 4D, steel guard plates 47 are fastened to the sides of the trailer header 34 covering the door tracks 33 and rollers 41 to protect them.

It will be understood that the foregoing detailed description is illustrative only and that modifications and adaptations may be made without departing from the spirit and scope of the invention.

What is claimed:

1. An exterior door for providing access to the interior of a vehicle comprising a roll door and means for mounting said roll door on the outside of said vehicle;

wherein said door tracks have open sides which face outwardly and are mounted inwardly from the rear edge of said vehicle along said header, and before reaching the top corner of the vehicle, said tracks curve towards outer edges, and then curve back to form said top rails substantially flush with the roof of said vehicle;

thereby to allow said door to seal said vehicle when in a down closed-position, while allowing said door to clear the corner of said vehicle during opening, and then allowing the opened door to sit above the roof when in the up, fully-open position.

2. A door as defined in claim 1 wherein the externally mounted roll door is constructed of multiple terminal and intermediate panels; said terminal panels being at the top and bottom of said door, and said intermediate panels being between the top and bottom panels and narrower than said terminal panels.

3. A door as defined in claim 1 wherein said panels are held together using hinges that can be folded on themselves.

4. A door as defined in claim 3 wherein abutting edges of said door panels are beveled for clearance.

5. A door as defined in claim 1 wherein said door panels are notched along their edges and weather stripped therein to prevent leakage.

6. A door as defined in claim 1 wherein said door has rollers mounted on brackets, with one end of each bracket holding a roller, and the other end being fastened to the center of the outer edge of the associated door panel.

7. A door as defined in claim 1 wherein the exterior door of said trailer is raised by a spring mechanism.

8. A door as defined in claim 7 wherein said spring mechanism for said exterior door is mounted on a nose rail of said trailer rather than being mounted inside where it would take up cargo space.

9. A door as defined in claim 7 wherein said spring mechanism is mounted underneath said trailer rather than outside said the trailer where it would take up cargo space.

10. A door as defined in claim 1 wherein to mitigate damage from side impacts, steel guard plates are fastened to the sides of said header.

11. An exterior door for providing access to the interior of a vehicle comprising a roll door and means for mounting said roll door on the outside of said vehicle;

wherein door tracks are mounted on the outside of said vehicle in channels in the sides of a header for said vehicle, and as top rails on said vehicle;

wherein to mitigate damage from side impacts, steel guard plates are fastened to the sides of said header; and wherein said guard plates cover door tracks and rollers.

12. A door as defined in claim 1 wherein said door is an exterior roll door for a trailer, which can be opened and closed in confined spaces and during opening and closing, said door extends inches beyond the rear edge of said trailer.

13. A door as defined in claim 12 wherein in an up position, said door is stored inches above the roof of said trailer and parallel to it and said door does not extend beyond the sides of said trailer at any time.

14. A door as defined in claim 1 wherein said door is an exterior roll door for a trailer, that does not take up any space inside said trailer since said door has mounting and operating hardware mounted on the exterior of said trailer.

15. A door as defined in claim 14 wherein said trailer has a header equipped with a door no wider than the header on a swing door trailer and a door spring is mounted on the nose rail of said trailer or under the floor of the trailer so that it neither takes up cargo space nor extends beyond the legal exterior dimensions of said trailer; whereby the exterior roll door mounts where a swing door normally mounts, so that a trailer with an exterior roll door will have all of the cargo space that a swing door trailer has.

16. A door as defined in claim 1 wherein said door is an exterior roll door that does not have substantially more moving parts than a prior art roll door, and does not require substantially different hardware.

17. A door as defined in claim 16 wherein door rollers from a garage door are used; door tracks from a garage door are used and specifically bent at associated corners of said trailer; door cables are longer than door cables on said garage door; hinges foldable on themselves, not found on prior art trailer designs, are used; door panels are shorter and more numerous than on prior art doors; and prior art springs are used when mounted on the trailer nose, and less complicated commercially available springs are used when the springs are mounted beneath the trailer; thereby to avoid exterior clearance problems by using a roll-door and avoid interior cargo clearance problems by mounting to door and door tracks outside the trailer, with no part of the door or door assembly protrudes outside the legal exterior dimensions for semi-trailers, and no part of the door or door assembly intrudes into the cargo space of the trailer, with significantly no more moving parts than a part roll door, be no harder to repair than a prior art roll door, to be as durable as prior art designs, not leak in the rain, and be protected against damage done by forklifts or other trucks.

* * * * *